United States Patent [19]

Fujiwara et al.

[11] Patent Number: 4,951,233
[45] Date of Patent: Aug. 21, 1990

[54] DOCUMENT PRODUCING APPARATUS HAVING IN-DOCUMENT LAYOUT DISPLAY

[75] Inventors: Masaki Fujiwara, Hitachi; Masaki Kawase, Katsuta; Kiyoshi Masuda, Hitachi; Shigeki Taniguchi, Hitachi, all of Japan

[73] Assignee: Hitachi, Ltd., Tokyo, Japan

[21] Appl. No.: 227,891

[22] Filed: Aug. 3, 1988

[30] Foreign Application Priority Data

Aug. 5, 1987 [JP] Japan .................................. 62-194494
Aug. 5, 1987 [JP] Japan .................................. 62-194495

[51] Int. Cl.⁵ .............................................. G06F 15/20
[52] U.S. Cl. .................................. 364/523; 364/900; 340/747
[58] Field of Search .............................. 364/518–523, 364/900 MS File; 340/723, 747, 750, 798–800

[56] References Cited

U.S. PATENT DOCUMENTS

| | | | |
|---|---|---|---|
| 4,441,829 | 4/1984 | Hebert, Jr. et al. | 364/900 |
| 4,604,710 | 8/1986 | Amezcua et al. | 364/900 |
| 4,642,792 | 2/1987 | Clements et al. | 364/900 |
| 4,656,602 | 4/1987 | Berkland et al. | 364/900 |
| 4,677,571 | 6/1987 | Riseman et al. | 364/319 |
| 4,679,153 | 7/1987 | Robinson et al. | 364/523 |
| 4,723,210 | 2/1988 | Barker et al. | 364/300 |
| 4,823,303 | 4/1989 | Terasawa | 364/521 |
| 4,831,552 | 5/1989 | Scully et al. | 364/521 X |

FOREIGN PATENT DOCUMENTS 61-65359 4/1986 Japan .

Primary Examiner—Gary V. Harkcom
Assistant Examiner—H. R. Herndon
Attorney, Agent, or Firm—Antonelli, Terry, Stout & Kraus

[57] ABSTRACT

A document producing apparatus comprises an input unit for inputting descriptive contents such as characters or figures which contstruct a document and a format which defines a sheet size of a paper sheet used, a sheet direction of portrait or landscape in which the sheet is to be used, and a layout of the descriptive contents in each page, a storage unit for storing therein the descriptive contents and the format inputted from the input unit, a display unit for selectively displaying the contents stored in the storage unit, and an in-document layout editing unit for displaying on the display unit a layout of a plurality of pages forming the document so that page information of the respective pages are partitioned in due order from a leading page and for every predetermined number of pages and are arranged in one display image, the page information including at least the sheet size and the sheet direction stored in the storage unit. The apparatus may further comprise a page editing unit for performing the editing for a desired page while referring to a display image displayed on the display unit.

5 Claims, 18 Drawing Sheets

FIG. 8A

| CHAPTER INFORMATION | | | PRODUCED DOCUMENT ( PAGE 1 OF 37 ) |
|---|---|---|---|

1ST CHAPTER [PREFACE ] 1ST~2ND PAGE [A4][A4] ↵

2ND CHAPTER [SUMMARY ] 3RD~5TH PAGE [A4][A4][A4] ↵

3RD CHAPTER [FUNCTIONS OF XYZ] 6TH~32ND PAGE [A4][A3][A3][A4][A4][A4][A4][A4][A4]
[A4][A4][A4][A4][A4][A4][A4][A4][A4]
[A4][A4][A3][A3][A3][A3][A3] ↵

4TH CHAPTER [STUDY OF RESULTS] 33RD~37TH PAGE [A4][A4][A4][A4][A4] ↵

| CHAPTER INFORMATION | | PRODUCED DOCUMENT( PAGE 1 OF 37 ) |
|---|---|---|

1ST CHAPTER [PREFACE ]1ST~2ND PAGE [A4] [A4] ⤶

2ND CHAPTER [SUMMARY ]3RD~5TH PAGE [A4] [A4] [A4] ⤶

3RD CHAPTER [FUNCTIONS OF XYZ ]6TH~32ND PAGE [A4] [A3] [A3] [A4] [A4] [A4] [A4] [A4] [A4] [A4]
[A4] [A4] [A4] [A4] [A4] [A4] [A4] [A4] [A4]
[A4] [A4] [A3] [A3] [A3] [A3] [A3] ⤶

4TH CHAPTER [STUDY OF RESULTS ]33RD~37TH PAGE [A4] [A4] [A4] [A4] [A4] ⤶

| CHAPTER INFORMATION | | PRODUCED DOCUMENT( PAGE 1 OF 37 ) |
|---|---|---|

1ST CHAPTER [PREFACE ]1ST~2ND PAGE [A4] [A4] ⤶

2ND CHAPTER [SUMMARY ]3RD~5TH PAGE [A4] [A4] [A4] ⤶

3RD CHAPTER [FUNCTIONS OF XYZ ]6TH~32ND PAGE [A4] [A3] [A3] [A4] [A4] [A4] [A4] [A4] [A4] [A4]
[A4] [A4] [A4] [A4] [A4] [A4] [A4] [A4] [A4]
[A4] [A4] [A3] [A3] [A3] [A3] [A3] ⤶

4TH CHAPTER [STUDY OF RESULTS ]33RD~37TH PAGE [A4] [A4] [A4] [A4] [A4] ⤶

| CHAPTER INFORMATION | | PRODUCED DOCUMENT( PAGE 1 OF 37 ) |
|---|---|---|
| 1ST CHAPTER [PREFACE ] | 1ST~2ND PAGE | [A4][A4] ⤴ |
| 2ND CHAPTER [SUMMARY ] | 3RD~5TH PAGE | [A4][A4][A4] ⤴ |
| 3RD CHAPTER [FUNCTIONS OF XYZ ] | 6TH~32ND PAGE | [A4][A3][A3][A4][A4][A4][A4][A4][A4][A4] [A4][A4][A4][A4][A4][A4][A4][A4][A4] [A4][A4][A3][A3][A3][A3][A3] ⤴ |
| 4TH CHAPTER [STUDY OF RESULTS] | 33RD~37TH PAGE | [A4][A4][A4][A4][A4] ⤴ |
| ⤵ | | |

FIG. 8E

| CHAPTER INFORMATION | | PRODUCED DOCUMENT( PAGE 1 OF 37 ) |
|---|---|---|
| 1ST CHAPTER [PREFACE ] | 1ST~2ND PAGE | [A4][A4] ⤴ |
| 2ND CHAPTER [SUMMARY ] | 3RD~5TH PAGE | [A4][A4][A4] ⤴ |
| 3RD CHAPTER [FUNCTIONS OF XYZ ] | 6TH~32ND PAGE | [A4][A3][A3][A4][A4][A4][A4][A4][A4][A4] [A4][A4][A4][A4][A4][A4][A4][A4][A4] [A4][A4][A3][A3][A3][A3][A3] ⤴ |
| 4TH CHAPTER [STUDY OF RESULTS] | 33RD~37TH PAGE | [A4][A4][A4][A4][A4] ⤴ |
| ⤵ | | |

FIG. 8F

| CHAPTER INFORMATION | PRODUCED DOCUMENT( PAGE 1 OF 37 ) |
|---|---|
| 1ST CHAPTER [PREFACE ]1ST~2ND PAGE [A4][A4]⤶ |
| 2ND CHAPTER [SUMMARY ]3RD~5TH PAGE [A4][A4][A4]⤶ |
| 3RD CHAPTER [FUNCTIONS OF XYZ]6TH~32ND PAGE [A4][A3][A3][A4][A4][A4][A4][A4][A4][A4] |
| [A4][A4][A4][A4][A4][A4][A4][A4][A4][A4] |
| [A4][A4][A3][A3][A3][A3][A3]⤶ |
| 4TH CHAPTER [STUDY OF RESULTS]33RD~37TH PAGE [A4][A4][A4][A4][A4]⤶ |
| ⤓ |

FIG. 8G

| CHAPTER INFORMATION | PRODUCED DOCUMENT( PAGE 1 OF 37 ) |
|---|---|
| 1ST CHAPTER [SUMMARY ]1ST~3RD PAGE [A4][A4][A4]⤶ |
| 2ND CHAPTER [FUNCTIONS OF XYZ]4TH~30TH PAGE [A4][A3][A3][A4][A4][A4][A4][A4][A4] |
| [A4][A4][A4][A4][A4][A4][A4][A4][A4] |
| [A4][A4][A3][A3][A3][A3][A3]⤶ |
| 3RD CHAPTER [STUDY OF RESULTS]31ST~35TH PAGE [A4][A4][A4][A4][A4]⤶ |
| 4TH CHAPTER [PREFACE ]36RD~37TH PAGE [A4][A4]⤶ |
| ⤓ |

FIG. 9

```
PLEASE INPUT CHAPTER NAME
               .
[PURPOSE OF DEVELOPMENT]
```

FIG. 10

```
     PLEASE DESIGNATE DESIRED FORMAT

SHEET SIZE          ○A3 ●A4 ○A5 ○B4 ○B5 ○POSTCARD ○FREE
SHEET DIRECTION     ○PORTRAIT ●LANDSCAPE
CHARACTER           ●LEFT-       ○UP-TO-DOWN
    DIRECTION        TO-RIGHT
LEFT MARGIN         [    10 ]
RIGHT MARGIN        [    10 ]
TOP MARGIN          [    10 ]
BOTTOM MARGIN       [    10 ]
                       :
                       :
```

FIG. 11

| SHEET SIZE | SHEET DIRECTION | PAGE PATTERN DATA |
|---|---|---|
| A 3 | PORTRAIT | [A3] |
| | LANDSCAPE | [A3] |
| A 4 | PORTRAIT | [A4] |
| | LANDSCAPE | [A4] |
| A 5 | PORTRAIT | [A5] |
| | LANDSCAPE | [A5] |
| B 4 | PORTRAIT | [B4] |
| | LANDSCAPE | [B4] |
| B 5 | PORTRAIT | [B5] |
| | LANDSCAPE | [B5] |
| POSTCARD | PORTRAIT | [P] |
| | LANDSCAPE | [P] |
| FREE | PORTRAIT | [F] |
| | LANDSCAPE | [F] |
| CHAPTER END MARK | | ⊃ |
| DOCUMENT END MARK | | ⸮ |

DOCUMENT PRODUCING APPARATUS HAVING IN-DOCUMENT LAYOUT DISPLAY

BACKGROUND OF THE INVENTION

1. Field of the Invention

The present invention relates to a document producing apparatus, and more particularly to a document producing apparatus capable of simply performing the editing of an inputted document.

2. Description of the Related Art

In recent years, document producing apparatuses such as word processors can perform a variety of editing for a document made of various data including tests (or characters), figures and graphs, for example, movement or duplication in units of page and the change of a format such as a paper sheet size in units of page. In such a document producing apparatus, there is desired the provision of means capable of visually confirming, before printing/displaying of an inputted document, how the whole of the inputted document is edited and readily making any change thereto, if desired. As means for confirming the construction of pages in the whole of a document is known means for pictorially displaying the pages of the document on a display screen to demonstrate the construction of the pages in the document, as has been disclosed by Japanese patent unexamined publication No. JP-A-61-65359. Also, there is known means for displaying an in-page layout for any one page, as has been disclosed by Hitachi's Japanese word processor "Word Pal 260" manual.

However, the above-mentioned conventional apparatuses involve the following problems. Namely, in the apparatus disclosed by the No. JP-A-61-65359, information concerning each page is only displayed pictorially. Therefore, in the case where the number of pages forming a document is large or in the case where the format of a paper sheet is changed in units of page, it is hard to grasp which picture does a page to be edited correspond to. Also, in the case of displaying the in-page layout in the Hitachi's Word Pal 260, though detailed information included in any page can be confirmed, the confirmation of the entire document requires a troublesome operation including a change-over between pages.

SUMMARY OF THE INVENTION

A first object of the present invention is to solve the above-mentioned problems in the conventional apparatuses or to provide a document producing apparatus provided with means for displaying through a simple operation the construction of the whole of a document being inputted.

A second object of the present invention is to provide a document producing apparatus provided with means for performing the editing inclusive of the change of format and/or the addition, deletion, movement and/or duplication of a page(s) while referring to the construction of the whole of the document which is being inputted and is being displayed by the above-mentioned displaying means.

To attain the above-mentioned first object, a document producing apparatus according to a first aspect of the present invention comprises an input unit for inputting descriptive contents such as characters or figures which construct a document and a format which defines a sheet size of a paper sheet used, a sheet direction of portrait (lengthways) or landscape (sideways) in which the sheet is to be used, and a layout of the descriptive contents in each page, a storage unit for storing therein said descriptive contents and said format inputted from said input unit, a display unit for selectively displaying the contents stored in said storage unit, and in-document layout displaying means for displaying on said display unit a layout of a plurality of pages forming said document so that page information of the respective pages are partitioned in due order from a leading page and for every predetermined number of pages and are arranged in one display image, said page information including at least the sheet size and the sheet direction stored in said storage unit.

To attain the above-mentioned second object, a document producing apparatus according to a second aspect of the present invention comprises an input unit for inputting descriptive contents such as characters or figures which construct a document and a format which defines a sheet size of a paper sheet used, a sheet direction of portrait (lengthways) or landscape (sideways) in which the sheet is to be used, and a layout of the descriptive contents in each page, a storage unit for storing therein said descriptive contents and said format inputted from said input unit, a display unit for selectively displaying the contents stored in said storage unit, in-document layout editing means including means for displaying on said display unit a layout of a plurality of pages forming said document so that page information of the respective pages are partitioned in due order from a leading page and for every predetermined number of pages and are arranged in one display image, said page information including at least the sheet size and the sheet direction stored in said storage unit, in-page layout editing means including means for displaying an in-page layout for any one of said plurality of pages, editing control means for performing a selective change-over between a document editing mode in which said in-document layout editing means operates and a page editing mode in which said in-page layout editing means operates, means for specifying a page having been displayed in said page editing mode on a display image displayed on said display unit in said document editing mode in the case where a change-over from said page editing mode to said document editing mode is made by said editing control means, means for designating a page to be displayed in said page editing mode on a display image displayed on said display unit in said document editing mode in the case where a change-over from said document editing mode to said page editing mode is made by said editing control means, and page editing means for selecting one or more pages the editing of which is desired and a type of the desired editing on the basis of information inputted from said input unit and executing the selected type of editing for the selected one or more pages.

BRIEF DESCRIPTION OF THE DRAWINGS

FIG. 8A is a view showing an example of an image displayed in an in-document layout editing mode;

FIG. 8B is a view showing an example of a display image in the case where one page is designated in the in-document layout editing mode;

FIG. 8C is a view showing an example of a display image in the case where a plurality of pages are designated by a range designation in the in-document layout editing mode;

FIG. 8D is a view showing an example of a display image in the case where one chapter is designated in the in-document layout editing mode;

FIG. 8E is a view showing an example of a display image in the case where a plurality of chapters are designated by a range designation in the in-document layout editing mode;

FIG. 8F is a view showing an example of a display image after a page format has been changed in the in-document layout editing mode;

FIG. 8G is a view showing an example of a display screen image after chapters have been moved in the in-document layout editing mode;

FIG. 9 is a view showing an example of an auxiliary display image for the change of a chapter name;

FIG. 10 is a view showing an example of an auxiliary display screen image for the change of a page format; and, FIG. 11 is a view showing page pattern date.

DESCRIPTION OF THE PREFERRED EMBODIMENTS

Generally, in a word processor, a user first establishes a format inclusive of a size of a paper sheet used, a direction of portrait (lengthways) or landscape (sideways) in which the sheet is to be used, and so on and inputs a desired document inclusive of characters, figures and graphs by means of an input device such as a keyboard. The inputted document is stored into a memory in accordance with the established format. The user can confirm the contents of the stored document by selectively displaying any one of pages forming the document on a display such as a cathode-ray tube (CRT). Though a document producing apparatus according to the present invention is provided with such functions of the general word processor, detailed explanation thereof will be omitted. The term "chapter" used in conjunction with an embodiment which will be explained hereinafter means one partition made of one or more consecutive pages and is irrelevant to which title is given to the partition by the user in the document actually inputted by the user. For example, when the user divides a document made of first to eighth paragraphs into one partition consisting of the first to fourth paragraphs and another partition consisting of the fifth to eighth paragraphs, the present embodiment handles the first to fourth paragraphs as a first chapter and the fifth to eighth paragraphs as a second chapter. Accordingly, the term "chapter" is a name used for convenience' sake and can be represented by another term. Alternatively, any partition may be represented without a specified name but by a distinctive numeral such as "I", "II" or the like indicative of a partition (or chapter) number.

The present invention will now be explained with reference to the accompanying drawings in conjunction with the case where the invention is employed in a Japanese word processor by way of example. It is of course that the present invention is not limited to the Japanese word processor but may be applied to a word processor for any language.

Figure 1:
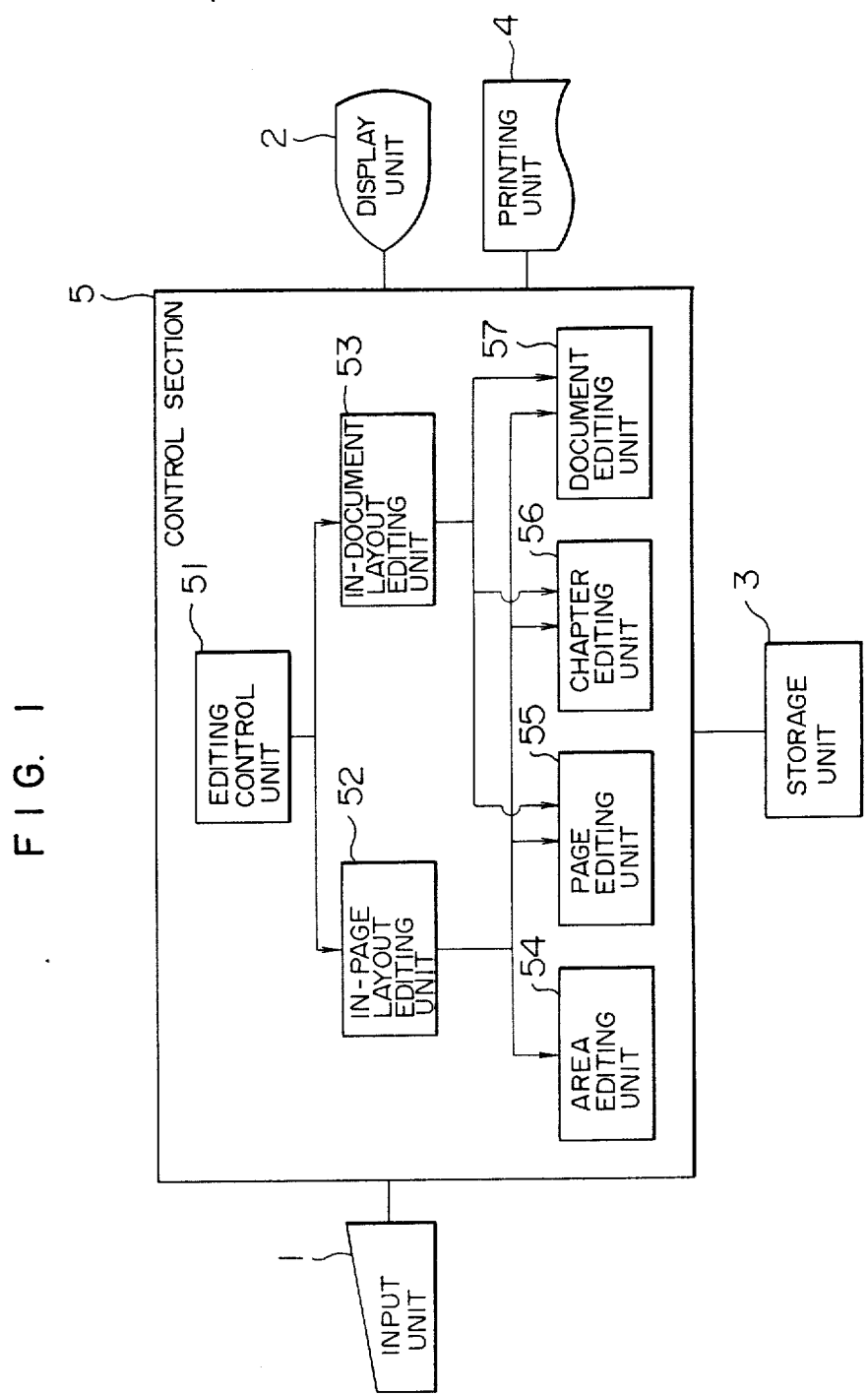
FIG. 1 is a block diagram showing the construction of a document producing apparatus according to the present invention.

In FIG. 1 which is a block diagram showing the construction of a Japanese word processor to which the present invention is applied, reference numeral 1 designates an input unit such as a keyboard for inputting characters, commands, and so on, numeral 2 a display unit such as a CRT for displaying characters, figures, and so on, and numeral 3 a storage unit which may be a semiconductor memory or a magnetic storage and in which produced document data, various tables, character data, page pattern data, data to be displayed as an auxiliary display screen image, and so on as will be described hereinafter, are stored. Numeral 4 designates a printing unit such as a wire dot printer, and numeral 5 a control section such as a microprocessor for controlling the above-mentioned components. The control section 5 includes an editing control unit 51, an in-page layout editing unit 52, an in-document layout editing unit 53, an area editing unit 54, a page editing unit 55, a chapter editing unit 56 and a document editing unit 57.

Next, explanation will be made of the respective units constructing the control section 5. The editing control unit 51 performs a control for change-over between two editing modes, that is, an in-page layout editing mode and an in-document layout editing mode. In the in-page layout editing mode, the in-page layout editing unit 52 is enabled to make a control for various types of editing in accordance with an instruction or request from an operator while displaying on a screen of the display unit 2 a layout of the whole of one page of a document to by produced. In the in-document layout editing mode, the in-document layout editing unit 53 is enabled to make a control for various types of editing while displaying a layout of the whole of the document on the screen of the display unit 2 by virtue of page patterns, chapter names, etc. The various types of editing in the present embodiment are carried out by the editing units 54 to 57. The area editing unit 54 performs the creation of an area in a page in which information such as characters, figures or the like is to be represented or materialized, the actual representation of the information into the area, the updating of a certain area, and the size change, duplication, movement or the like of a specified area.

The page editing unit 55 performs the editing for every one of pages forming the document, for example, the duplication, movement or deletion of a page. The chapter editing unit 56 performs the editing for every one of chapters forming the document, for example, the duplication, movement or deletion of a chapter. The document editing unit 57 performs the editing in units of document, for example, the printing or registration of a document.

The producing and editing of a document in the Japanese word processor according to the present embodiment are carried out as follows.

First, a processing made by the editing control unit 51 enabled when in an initial state an operator instructs or requests to newly produce a document or to update the previously produced document, will be explained with reference to FIG. 6A.

Figure 3:
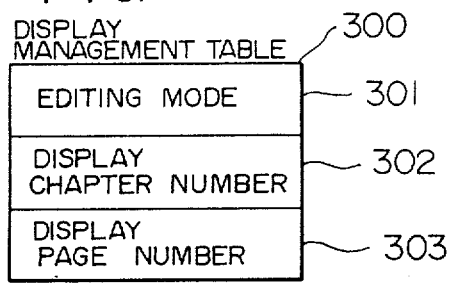
FIG. 3 is a view showing the construction of a display management table.
Figure 6A:
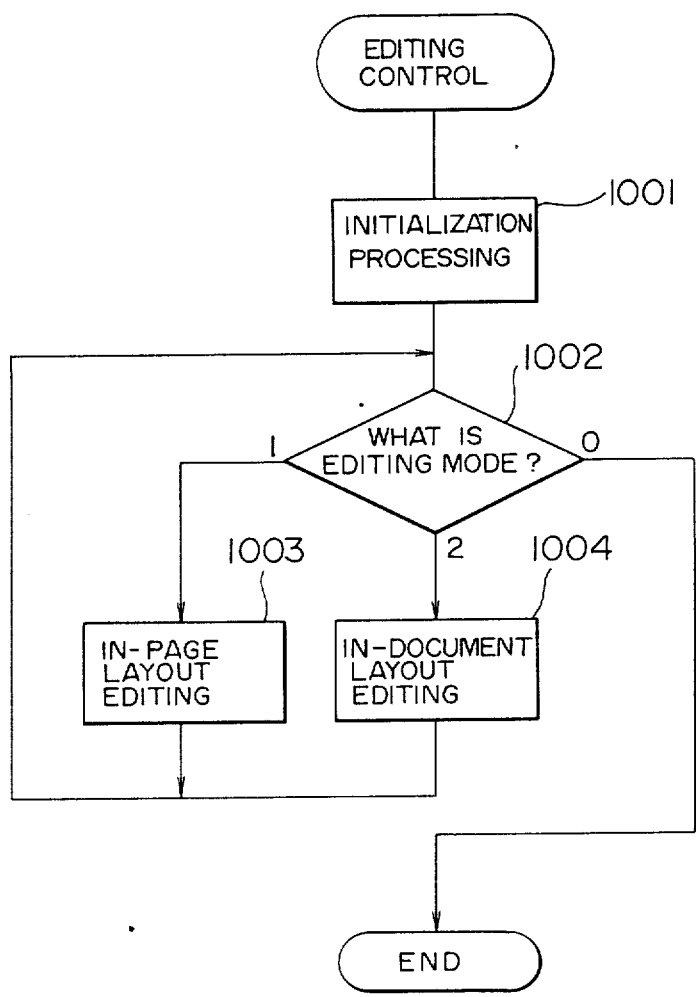
FIG. 6A is a view showing a processing made by an editing control unit.

The editing control unit 51 first determines whether the request from the operator is the new document production or the document updating and initializes document data in the case of the new document production or fetches data to be updated from the storage unit 3 in the case of the document updating (see step 1001 in FIG. 6A). The initialization processing for document data in the case of the new document production includes producing as initial data the first page of the first chapter of the document to be newly produced. Explanation of the construction of document data will be made in later. The initialization processing further includes setting into a display management table 300 (see FIG. 3) an editing mode 301 and the chapter and page numbers 302 and 303 of a chapter and a page to be first layout-displayed. In this stage of processing, the editing mode is set to "1" so that the editing of the document is started in an in-page layout editing mode which will be explained in later. Also, a page from which layout-display is to be started is set to a leading page in the document, that is, the first page of the first chapter in the document. Subsequently to the above initialization processing, the editing mode 301 is judged (step 1002) and the document is produced in accordance with the corresponding editing mode. For example, immediately after the document production has been instructed, an in-page layout editing is to be carried out since the editing mode 301 is set to "1" in step 1001. In the case where the change of editing mode has been instructed and completed in steps 1003 and 1004 which will be explained in later, the judgement in step 1002 is made again and the mode is changed to another editing mode (for example, in the case where the in-page layout editing has been carried out, a change to an in-document layout editing is made through step 1004). In the case where the completion of editing is indicated, the production of document is terminated in accordance with a similar judgement processing.

Now, the construction of document data will be explained by virtue of FIGS. 2A to 2E.

Figure 2:
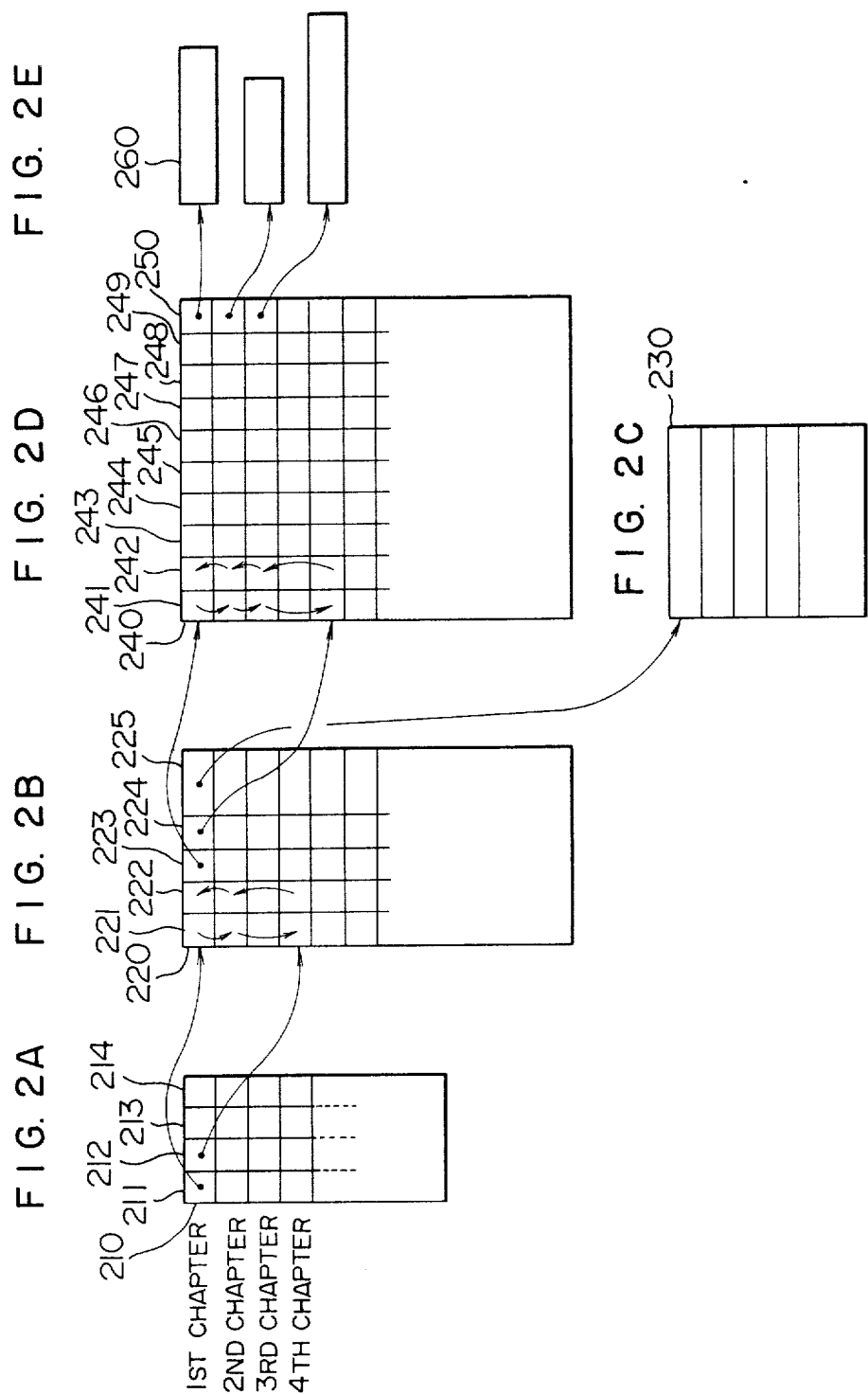
FIGS. 2A to 2E are views showing the constructions of various document data.

Document data is made of a chapter management table 210 shown in FIG. 2A, a page management table 20 shown in FIG. 2B, a page format table 230 shown in FIG. 2C, an area management table 240 shown in FIG. 2D, and in-area data 260 shown in FIG. 2E. Each table includes a plurality of blocks. In the case of the new document production, the contents of each table are cleared through the initialization process and related data are written into the corresponding table in accordance with the construction of a document inputted by a user. In the following, explanation will be made of each table.

Chapter Management Table 210

The chapter management table 210 manages how many chapters form the whole of a document. The chapter management table has, for every chapter, page pointers 211 and 212 indicative of leading and ending pages of the corresponding chapter. The chapter management table further holds, for every chapter, print information 213 for displaying/printing of header, footer, etc. and a chapter name 214 given to the corresponding chapter.

Page Management Table 220

The page management table 220 manages the order of arrangement of pages which form a document, formats which are used in the respective pages, and areas which are created or established in the pages and in which characters, figures or graphs are represented or materialized. Each block of the page management table has data concerning the corresponding page, that is, area pointers 223 and 224 indicative of leading and ending areas among areas established in that page (i.e. addresses of those regions of the area management table 240 in which data of the leading and ending areas are stored), a page format pointer 225 indicative of format data used in that page. The blocks in the page management table are not always arranged in the order of pages. Therefore, each block for any given page further has a rear pointer 221 indicative of the block of a page succeeding the given page and a front pointer 222 indicative of the block for a page preceding the given page. The leading and ending pages are pointed by the chapter management table 210.

Page Format Table 230

The page format table 230 manages a size (A3, A4, etc.) of a paper sheet, a direction (portrait or landscape) of the sheet, a direction (left-to-right or up-to-down) of characters, the number of columns, an interval between columns, top, bottom, left and right margins, and so on as a format of a document produced.

Area Management Table 240

The area management table 240 manages the positions and sizes of various data (for example, text data, figure data or graph data) to be stored in a document (or page). For that purpose, the area management table has, as position data of an area in a page, an x-coordinate 243 of the left and upper point of the area, a y-coordinate 244 thereof, an x-coordinate 245 of the right and lower point of the area, and a y-coordinate 246. As the origin of the coordinate system is taken the left and upper point of a portion of the page excepting the margins. The table 240 further has a data classification or identification 247 indicative of the type of data included in the area, an area attribute 248 indicative of an attribute of the area itself, and a data pointer 250 which points in-area data 260. The attribute of the area itself includes the discrimination of transparency and opaqueness and the type of a frame line of the area. (When the attribute of a certain area is opaqueness, an underlying portion of the opaque area is invisible.) In order to manage the order of overlapping of a plurality of areas in the same page, the areas are interlinked to each other by rear and front pointers 241 and 242 in the area management table 240. This linakge of areas is made in a direction from an area having a lower priority toward an area having a higher priority, that is, from the lowermost area in that page up to the uppermost area. The leading and ending areas in that page are pointed by the page management table 220. Furthermore, the area management table 240 has status information 249 indicative of whether or not the pertinent area is being subjected to an editing.

In-Area Data

The in-area data 260 is data stored in any area and includes text data, figure data, graph data, image data or the like.

Figure 6B:
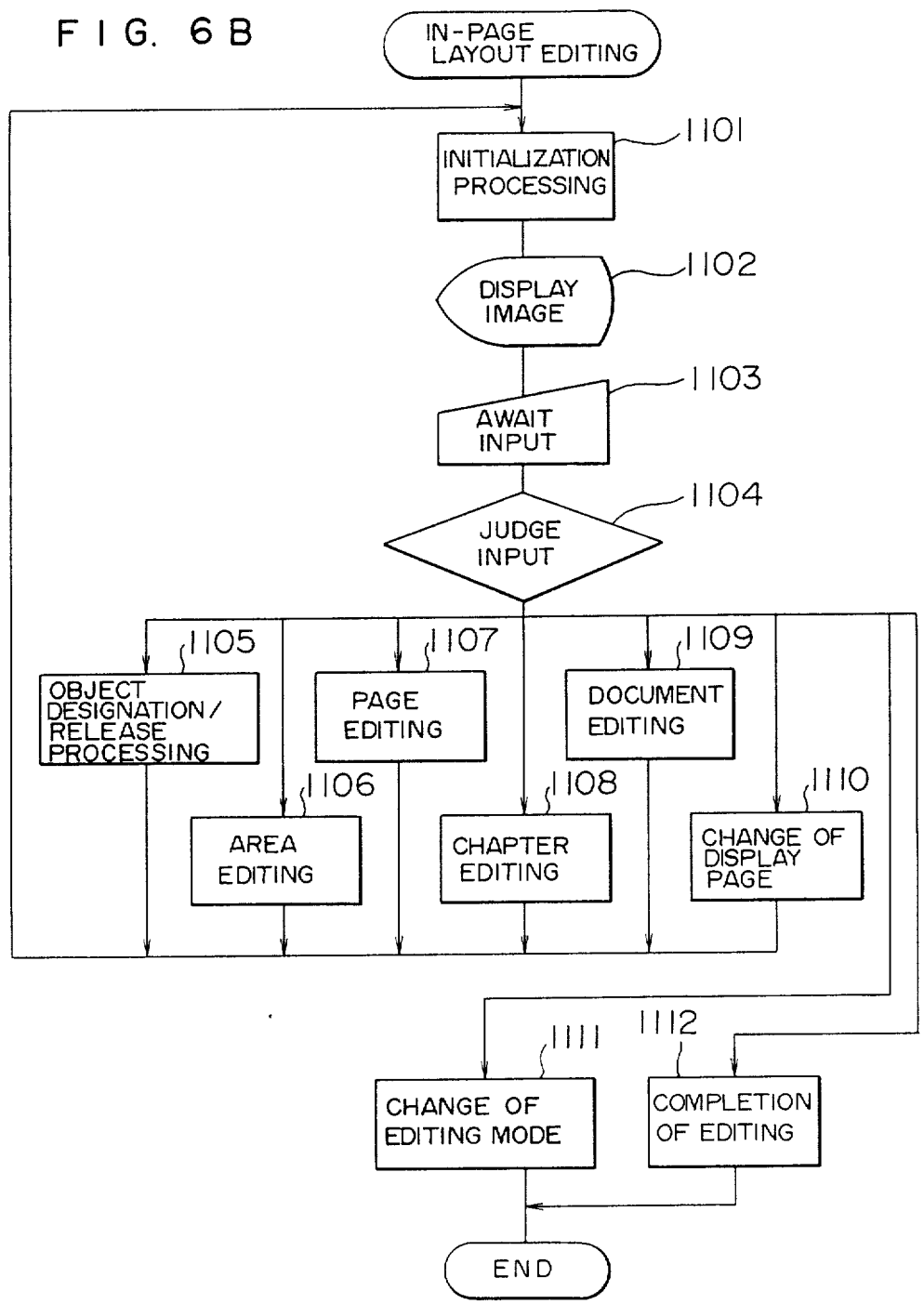
FIG. 6B is a view showing a processing made by an in-page layout editing unit.

If the in-page layout editing is requested in step 1003, the in-page layout editing unit 52 performs a processing in accordance with a flow chart shown in FIG. 6B.

Figure 4A:
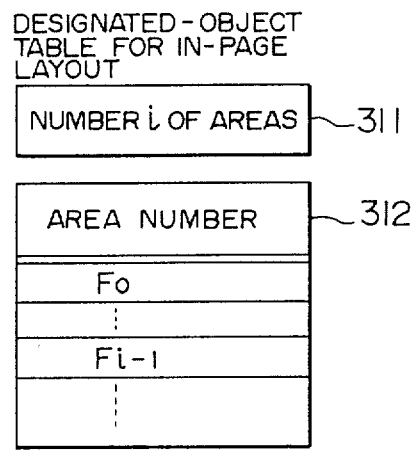
FIG. 4A is a view showing the construction of a designated-object table for in-page layout.

First, the number 311 of areas (see FIG. 4A) in a designated-object table for in-page layout is cleared to zero (step 1101 in FIG. 6B). Next, an in-page layout 420 and auxiliary information 410 (see FIG. 7A) are displayed on a screen of the display unit 2 in accordance with the display chapter number 302 and the display page number 303 (step 1102) and an input request is issued to the input unit 1 (step 1103). The auxiliary information includes the chapter number 401 of a chapter in which a page being layout-displayed exists, a name 404 of the chapter, the number 403 of pages included in the chapter, a consecutive page number 402 of the layout-displayed page in the chapter, the number 406 of pages included in the document to be produced, and a consecutive page number 405 of the layout-displayed page in the document (see FIG. 7A). Then, the results of an input from the operator are judged (step 1104). In the case where an area for which an operation or treatment is desired is designated, the in-page layout editing unit 52 determines, which area is being designated, on the basis of the display chapter and page numbers 302 and 303 of the chapter and page being displayed, a designated position of that area in a page, and position data 243 to 246 of that area, and registers the area number of that area into the designated-object table for in-page layout (step 1105). The designated-object table for in-page layout includes the number 311 of areas and an area number 312, as shown in FIG. 4A. The area number of the area designated by the operator is registered into the area number field 312 and the number 311 of areas is incremented by +1.

On the other hand, in the case where the request from the operator is the new creation of an area, the updating of the previously created area, or another editing treatment in units of area (for example, the size change, attribute change, duplication, movement or deletion of an area), the area editing unit 54 performs the requested editing of the pertinent area (step 1106). In the case where an editing treatment in units of page such as the format change, insertion, addition, duplication, movement or deletion of a certain page is requested, the page editing unit 55 performs the requested editing of that page (step 1107). In the case where an editing treatment in units of chapter such as the name change, insertion, addition, duplication, movement or deletion of a certain chapter is requested, the chapter editing unit 56 performs the requested editing of that chapter (step 1108). In the case where an editing treatment in units of document such as printing or registration is requested, the document editing unit 57 performs the requested document editing (step 1109). In the page editing treatment among the above-mentioned editing treatments, the page and chapter being displayed on the in-page layout display screen is handled as an object to be treated. (Detailed explanation of the page editing and the chapter editing will be made in later.)

When the request from the operator is the change of display page to, for example, the preceding page or the next page, the display chapter number 302 and the display page number 303 in the display management table 300 are updated (step 1110), a layout for the pertinent page is displayed (step 1102).

In the case where the request from the operator is one other than the above-mentioned requests or the change of editing mode, the editing mode 301 in the display management table 300 is set to "2" (step 1111), thereby terminating the processing. In the case where the completion of editing is indicated, the editing mode 301 is set to "0" (step 1112), thereby terminating the processing.

When the change of editing mode is requested in step 1111, the editing mode 301 is set to "2". As a result, the processing proceeds to an in-document layout editing (step 1004) through the judgement of editing mode in step 1002.

Figure 6C:
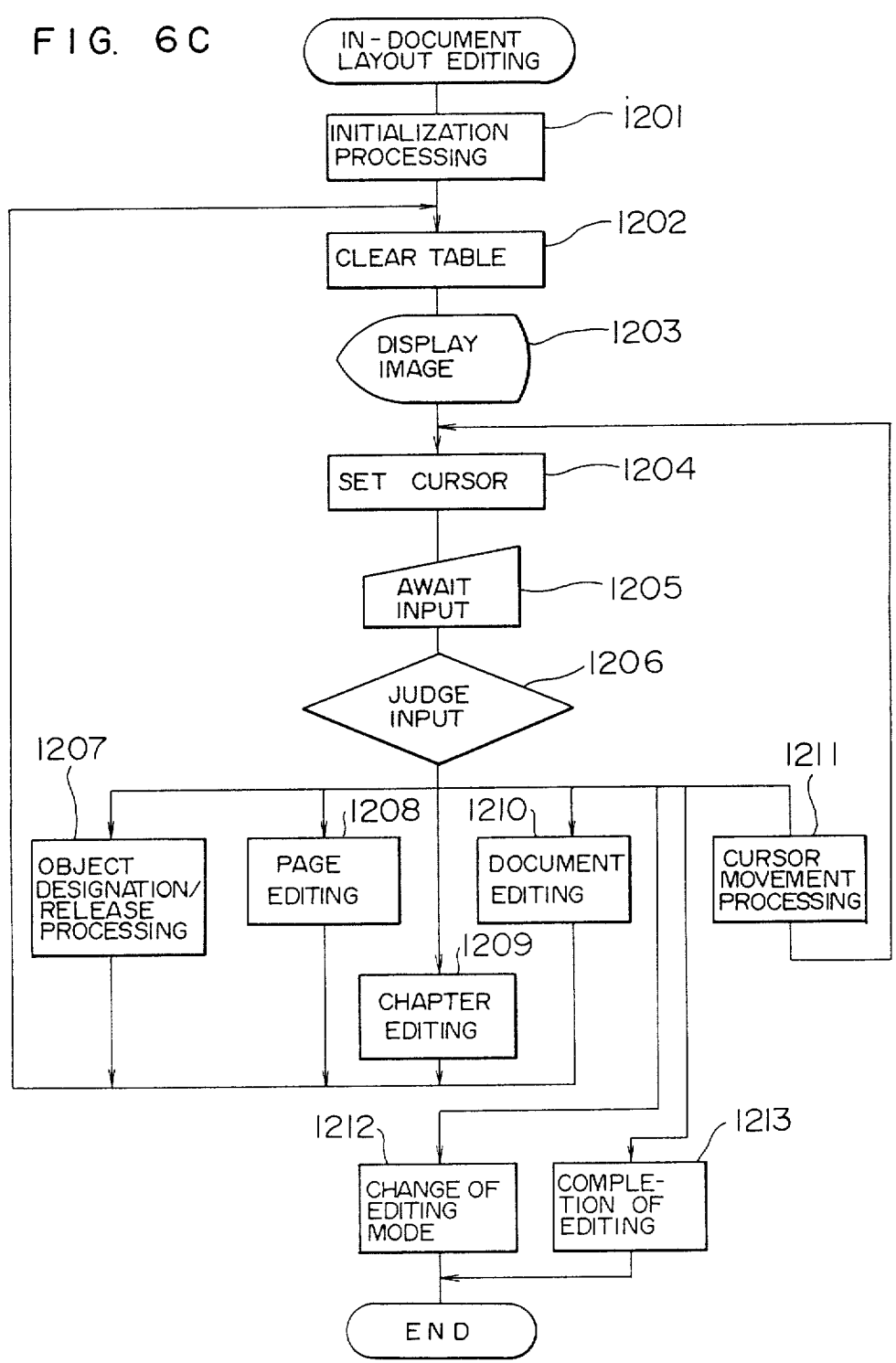
FIG. 6C is a view showing a processing made by an in-document layout editing unit.

Next, a processing made by the in-document layout editing unit 53 will be explained along a flow chart shown in FIG. 6C.

Figure 5:
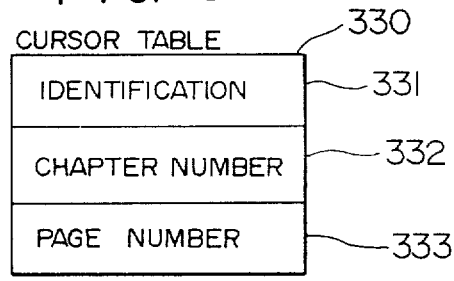
FIG. 5 is a view showing the construction of a cursor table.

First, the initialization processing for a cursor table 330 is made (step 1201). As shown in FIG. 5, the cursor table 330 includes three information, that is, identification 331 indicative of either the chapter information position or the page pattern position on the in-page layout displaying screen (see FIG. 8A) to which a cursor is set, the chapter number 332 indicative of the chapter number of a chapter to which the cursor is set, and the page number 333 indicative of the page number of a page to which the cursor is set.

In step 1201, the chapter number 332 and the page number 333 in the cursor table 330 are set in accordance with the display chapter number 302 and the display page number 303 in the display management table 300 in order that which one of pages in a document has been displayed in the in-page layout editing mode can be indicated by the initial setting position of the cursor. Subsequently, the number 322 of designated objects in a designated-object table 320 for in-document layout is clearned to zero (step 1202), an in-document layout 520 and auxiliary information 510 as shown in FIG. 8A are displayed on the display screen (step 1203), the cursor is displayed on the chapter information or page pattern determined according to the contents of the cursor table previously set in the step 1201 (step 1204) and an input request is issued to the input unit 1 (step 1205).

Figure 6D:
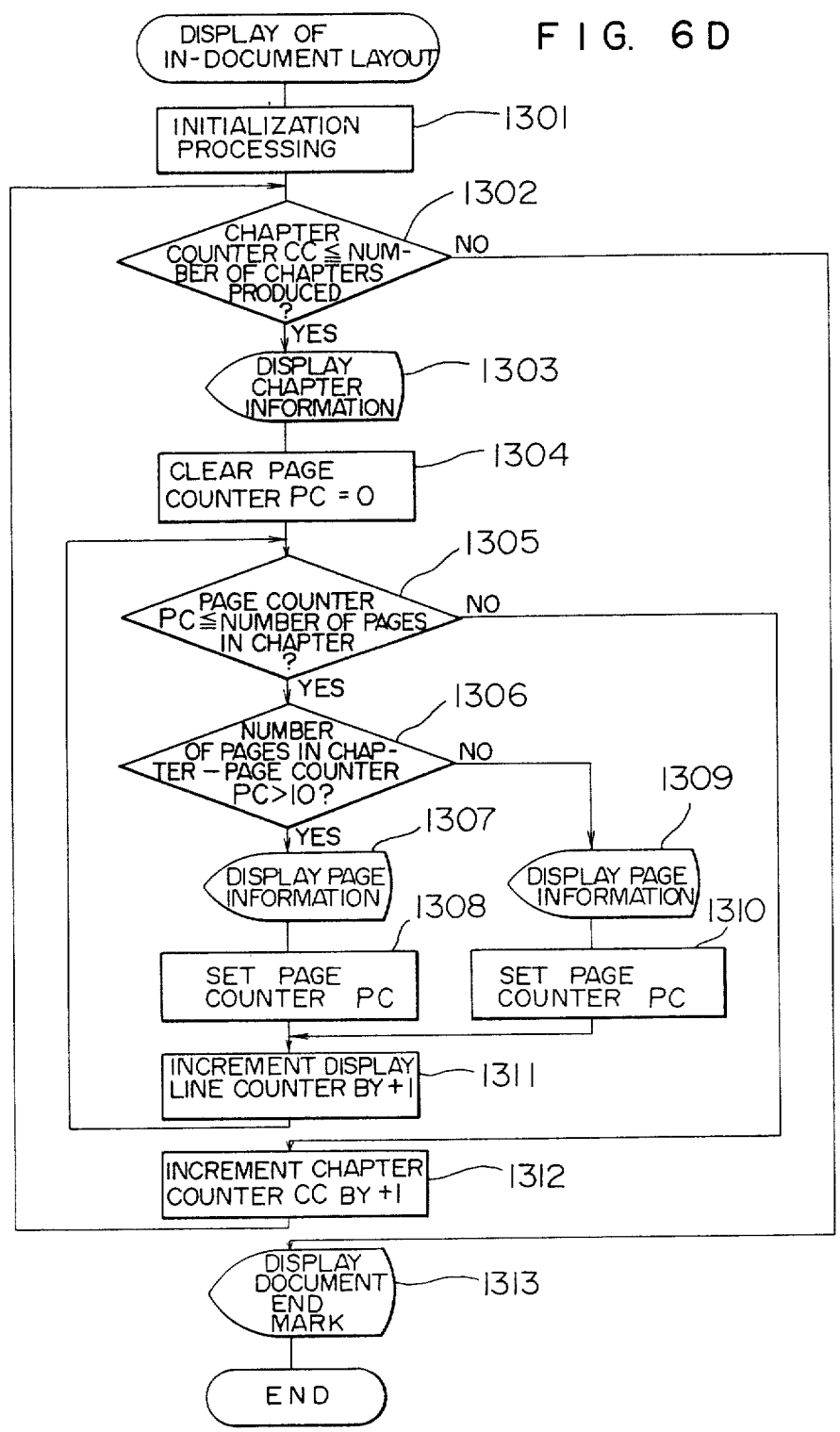
FIG. 6D is a view showing a processing for display of an in-document layout.

The display of an in-document layout in the above-mentioned step 1203 will now be explained in detail by use of a flow chart shown in FIG. 6D.

First, a chapter counter CC and a display line counter provided in the storage unit 3 and used in the subsequent processing are set to "1" (step 1301). Next, a judgement is made of whether or not the chapter counter CC exceeds the number of chapters produced in the whole of a document (step 1302). Namely, the subsequent display processing is repeated times equal to the number of chapters produced. If the chapter counter CC does not exceed the number of chapters produced, the chapter number 501 of a chapter, the chapter name 502 of that chapter, the page number 503 of a leading page in that chapter in the whole of the document, and the page number 504 of an ending page in that chapter in the whole of the document are displayed as chapter information on a line indicated by the display line counter (step 1303). Then, a page counter PC provided in the storage unit 3 is cleared to zero (step 1304). Next, a judgement is made of whether or not the page counter PC exceeds the number of pages produced in the pertinent chapter (step 1305). Namely, the subsequent display processing is repeated times equal to the number of pages produced. If the page counter PC does not exceed the number of pages produced, there is judged whether or not the number of the remaining pages in the pertinent chapter is greater than 10 (step 1306). Namely, the subsequent page pattern display is made partitively for every ten pages. When the number of the remaining pages is greater than 10, format information (inclusive of sheet size and sheet direction) for the pertinent ten pages and the corresponding page pattern data are read from the page format table 230 and the storage unit 3, respectively, and are displayed as page information on the display unit 2 (step 1307). And, "10" or the number of pages displayed is added into the page counter PC (step 1308). On the other hand, the number of the remaining pages is not greater than 10, the page patterns for the remaining pages are similarly displayed on the display unit 2 (step 1309) and a value equal to the number of pages displayed is added into the page counter PC (step 1310). In the step 1309, a chapter end mark 506 (see FIG. 8A) is further displayed in order to indicate that the pertinent position is the end of the pertinent chapter. After the above display processing, the display line counter is incremented by +1 (step 1311) and the processing is returned to step 1305 to display page information.

In the case where step 1305 determines that the page counter PC exceeds the number of pages in the pertinent chapter, "1" is added into the chapter counter CC (step 1312) and the process is returned to the step 1302 to display the next chapter.

When step 1302 determines the completion of display of all chapters, a document end mark 507 (see FIG. 8A) is displayed (step 1313), thereby terminating the in-document layout display processing.

An example of the page pattern data used in the above-mentioned in-document layout display processing is shown in FIG. 11. Those data corresponding to various formats are preliminarily prepared and are read from the storage unit 3 in accordance with the requested display.

Returning to FIG. 6C, when any input is supplied from the operator, a judgement of the results of the input is made (step 1206). In the case where the designation of an object (i.e. page or chapter) to which any treatment is desired is instructed or the release (or cancellation) of the previously designated object is instructed, a processing for designation/release of the object to be treated is performed in accordance with the instruction (step 1207).

Figure 6E:
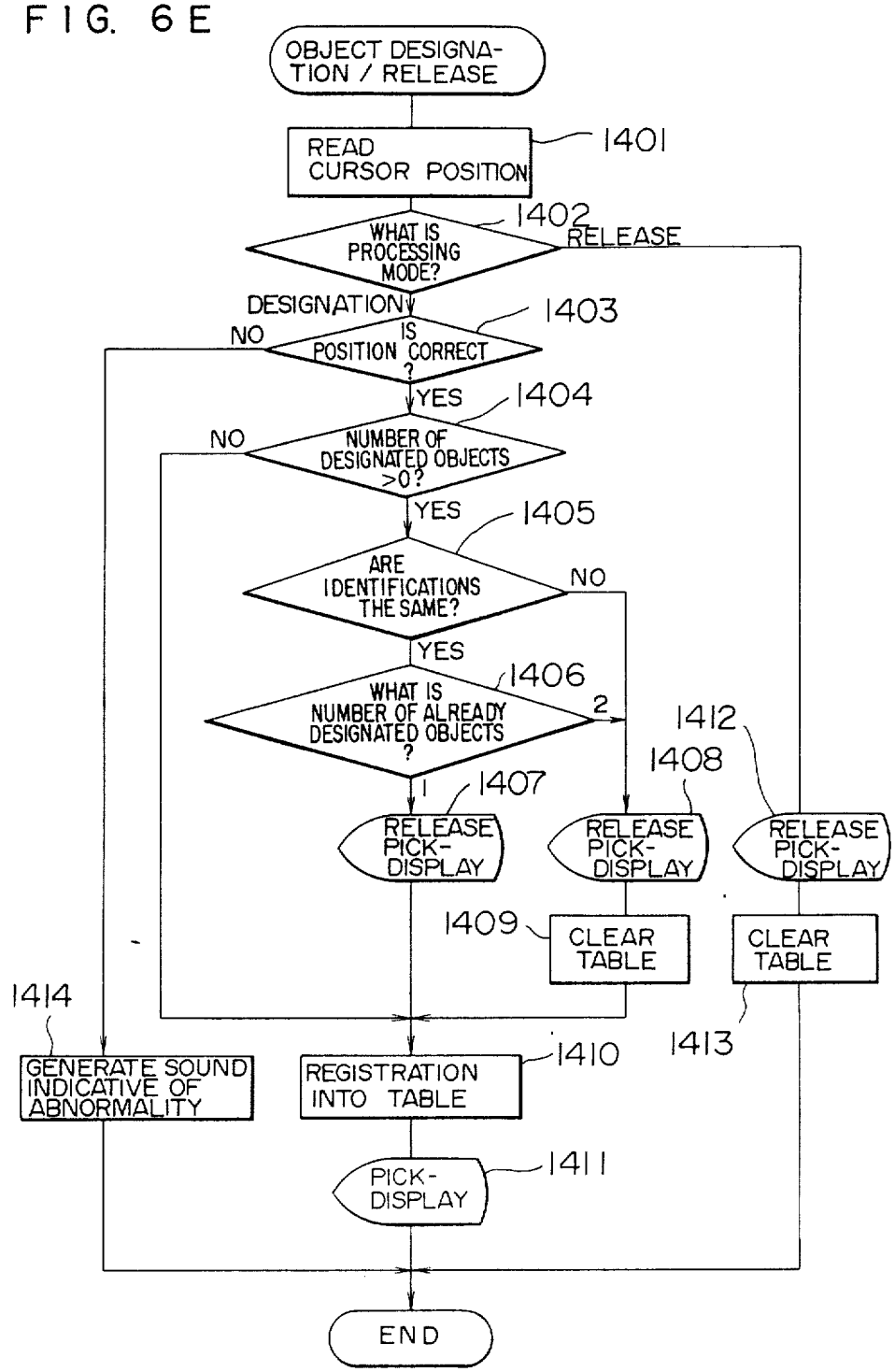
FIG. 6E is a view showing a processing for object designation/release.

Here, the object designation/release processing will be explained in detail by virtue of FIG. 6E.

Figure 4B:
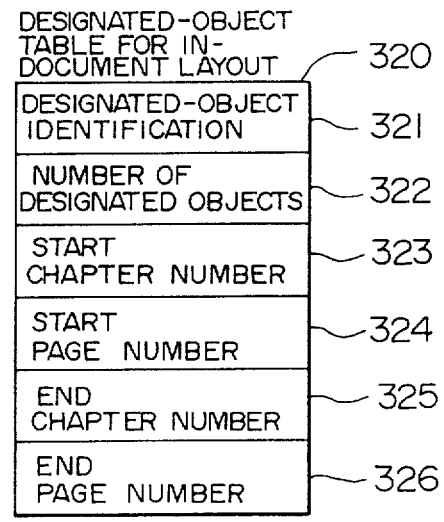
FIG. 4B is a view showing the construction of a designated-object table for in-document layout.

Prior to the detailed explanation of the object designation/release processing, reference will be made to the contents of the designated-object table 320 for in-document layout. As shown in FIG. 4B, the table 320 has a designated-object identification 321 indicative of which one of either a chapter or a page is being designated as an object to be treated, and the number 322 of designated objects indicative of whether or not an object to be treated is being designated. The number 322 of designated objects indicates in the case of "0" a condition that no object to be treated is being designated, in the case of "1" a condition that one page or chapter represented by the start chapter number 322 or the start page number 324 is being designated, and in the case of "2" a condition that chapters or pages over a range defined by the start and chapter numbers 323 and 325 or the start and end page numbers 324 and 326 are being designated.

Now, the object designation/release processing is carried out as follows. First, a position of the cursor is read from the cursor table 330 (step 1401 in FIG. 6E). Next, there is judged whether a processing mode is the designation or release of an object (step 1402). In the case of the object designation, a judgement is made of whether or not a position of the cursor on the in-document layout display image shown in FIG. 8A correctly coincides with the position read from the cursor table 330 (step 1403). When the cursor position is not correct, for example, when the designation is made for a position where no object is being displayed, a sound informing the operator of abnormality is generated (step 1414), thereby terminating the processing. On the other hand, when the cursor position is correct, a judgement is made of whether or not anything has already been designated (step 1404). In the case where nothing has been designated (or the number 322 of designated objects is zero), that is, in the case where no registration is made, a chapter or a page at which the cursor is present is regarded as the designated object and the pertinent identification 331, chapter number 332 and page number 333 are registered in the corresponding fields 321, 323 and 324 of the designated-object table 320 and the number 322 of designated objects is incremented by +1 (step 1410). And, the designated object is pick-displayed (step 1411). On the other hand, in the case where the step 1404 determines that anything has already been designated, a judgement is made of whether or not identifications are the same, that is, whether or not the identification 331 in the cursor table 330 and the designated-object identification 321 in the designated-object table 320 are the same (step 1405). In the case of the same identification, the number of objects which has already been designated is determined (step 1406). When the number is "1", the pick-display is released once (step 1407) and thereafter the registration into the table and the pick-display are made. When two objects have been registered (that is, a range designation has been made), the pick-display is released once (step 1408), the table is thereafter cleared (step 1409) and the designated contents are registered into the table. Namely, in the case where one object has been designated, a new designation is regarded as a designation at the second point in a range designation. On the other hand, in the case where two object have been designated (that is, a range designation has been made) or in the case where the identifications are different, the previous designation is cancelled once and a new designation is registered as the first designation into the table. When the step 1402 determines the designation release mode, the pick-display is released (step 1412) and the table is cleared (step 1413), thereby terminating the processing.

The "pick-display" referred to in the above-mentioned processing is made in order to inform the operator of what is the designated object. In the pick-display, the designated object is displayed with inversed black and white. In FIGS. 8B to 8E, a portion being pick-displayed is screened.

Figure 6F:
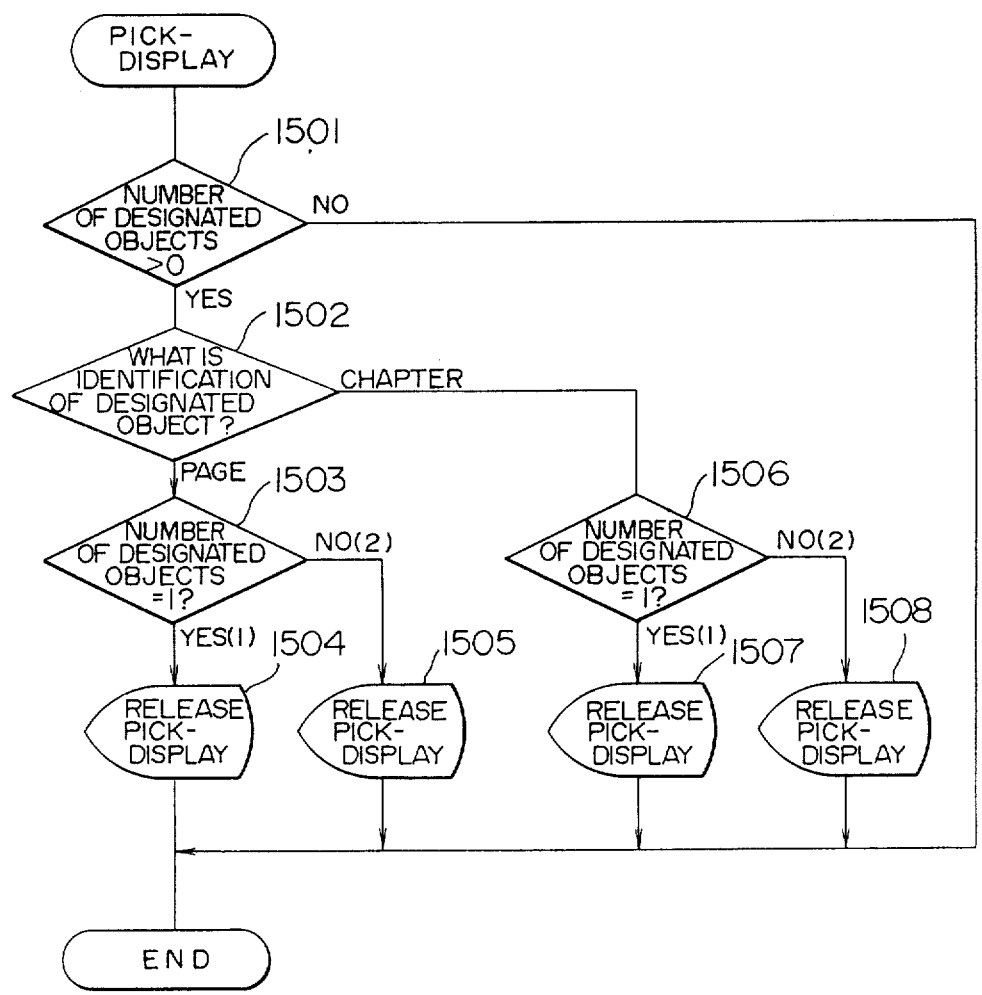
FIG. 6F is a view showing processing for pick-display.

Here, the pick-display will be further explained by virtue of FIG. 6F.

First, a judgement is made of whether or not the number 322 of designated objects is greater than zero (step 1501). When the number 322 is greater than zero, that is, when anything is designated as an object to be treated, the identification 321 of the designated object is determined (step 1502). In the case where a page is designated, there is judged whether or not the number 322 of designated objects is 1 (one) (step 1503). When the number 322 is 1 (one), a pick-display as shown in FIG. 8B is made (step 1504). When the number 322 is 2 (two), a pick-display as shown in FIG. 8C is made (step 1505). Also in the case where a chapter is designated, a similar judgement of the number 322 of designated objects is made (step 1506) and a pick-display as shown in FIG. 8D or 8E corresponding to the results of judgement (step 1507 or 1508).

Again returning to FIG. 6C, in the case where the request from the operator is an ending treatment or operation in units of page such as the format change, insertion, addition, duplication, movement or deletion of a page, the page editing unit 55 performs the requested editing of the pertinent page (step 1208). In the case where the request from the operator is an editing treatment in units of chapter such as the name change, insertion, addition, duplication, movement or deletion of a chapter, the chapter editing unit 56 performs the requested editing of the pertinent chapter (step 1209). In the case where the request from the operator is an editing treatment in units of document such as printing or registration, the document editing unit 57 performs the requested document editing (step 1210). In the page or chapter editing among these editings, the page or chapter designated on a screen on which the in-document layout is displayed is handled as an object to be treated. (Detailed explanation will be made in later.)

In the case where the request from the operator is the movement of a cursor, the chapter number 332 and the page number 333 in the cursor table 330 are updated in accordance with the designated direction (step 1211). When the position of the cursor is moved from the chapter information position to the page pattern position or from the page pattern position to the chapter information position by the rightward/leftward movement of the cursor, the identification 331 is correspondingly updated.

In the case where the request from the operator is a request other than the above-mentioned requests or the change of editing mode, the editing mode 301 in the display management table 300 is set to "1" (step 1212), thereby terminating the processing. In that case, if an object to be treated is designated, the start chapter number 323 and the start page number 324 in the designated-object table 320 for in-document layout are set into the display chapter number and the display page number 303 in the display management table 300 in contrast with the initialization processing in the step 1201. Thereby, when the change of editing mode is requested after a page desired by the operator is designated on the in-document layout display screen image, it is possible to see the layout for the pertinent page. In the case where the completion of editing is designated by the operator, the editing mode is set to "0" (step 1213), thereby terminating the processing.

Figure 6G:
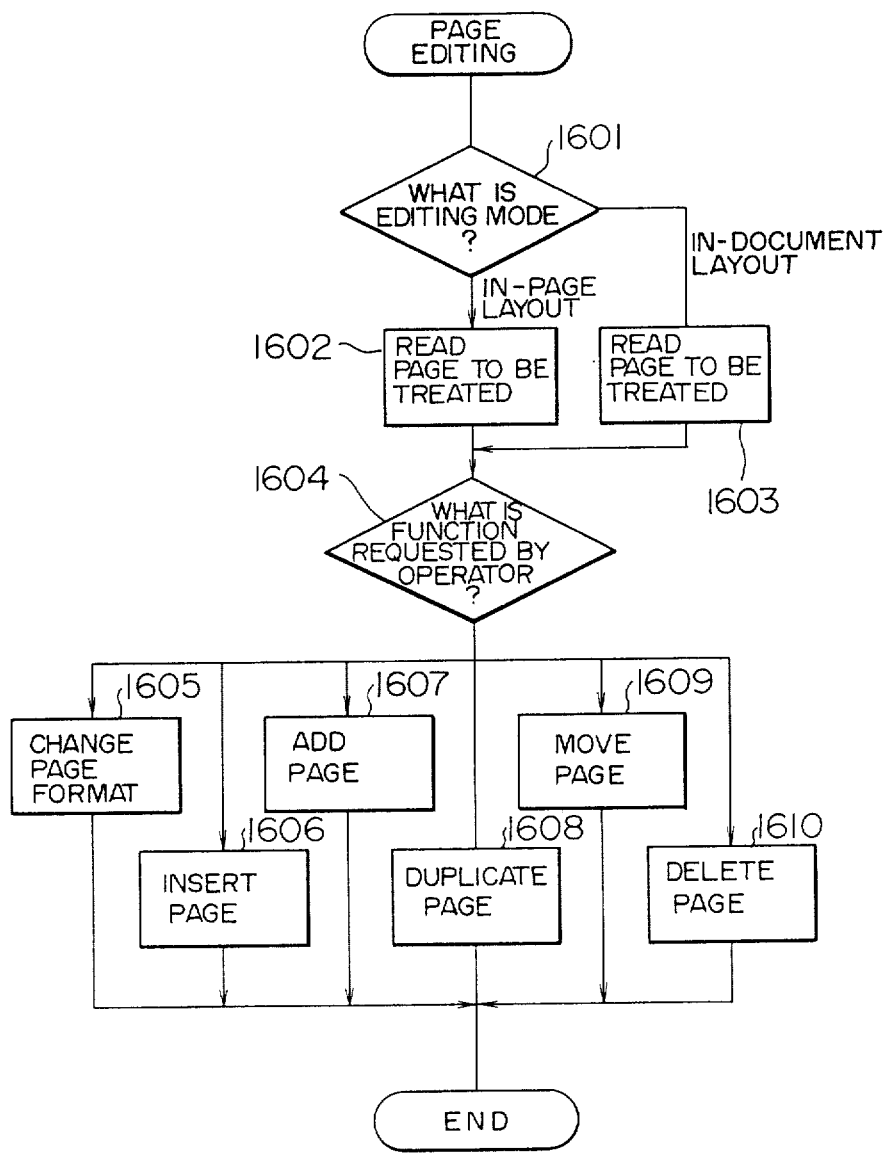
FIG. 6G is a view showing a processing made by a page editing unit.

Next, a processing made in the page editing unit 55 will be explained along a flow chart shown in FIG. 6G.

First, a judgement is made of whether the editing mode 301 is an in-page layout or an in-document layout (step 1601). In the case of the in-page layout editing mode, a page being displayed is read as an object to be treated from the display management table 300 (step 1602). In the case of the in-document layout editing mode, on the other hand, a page which is an object to be treated is read in accordance with information registered in the designated-object table 302 for in-document layout (step 1603). Next, what is a function requested by the operator is judged (step 1604) and the requested function is carried out (steps 1605 to 1610). Here, the change of page format (step 1605) will be explained by way of example. Now assume that the page format change is requested in a state in which a plurality of pages are being designated in the in-document layout editing mode, as shown in FIG. 8C. Then, an auxiliary screen image for format change is displayed, as shown in FIG. 10. Now, if the operator designates A4 size as the sheet size and landscape as the sheet direction and instructs the execution of a change to the designated format, format information 230 for all pages in a range defined by the start chapter number 323, the start page number 324, the end chapter number 325 and the end page number 326 is changed to the A4 size and the landscape direction, thereby terminating the processing. As a result, an in-document layout is displayed again through the step 1203 (see FIG. 6C) but with a screen image changed as shown in FIG. 8F.

Figure 6H:
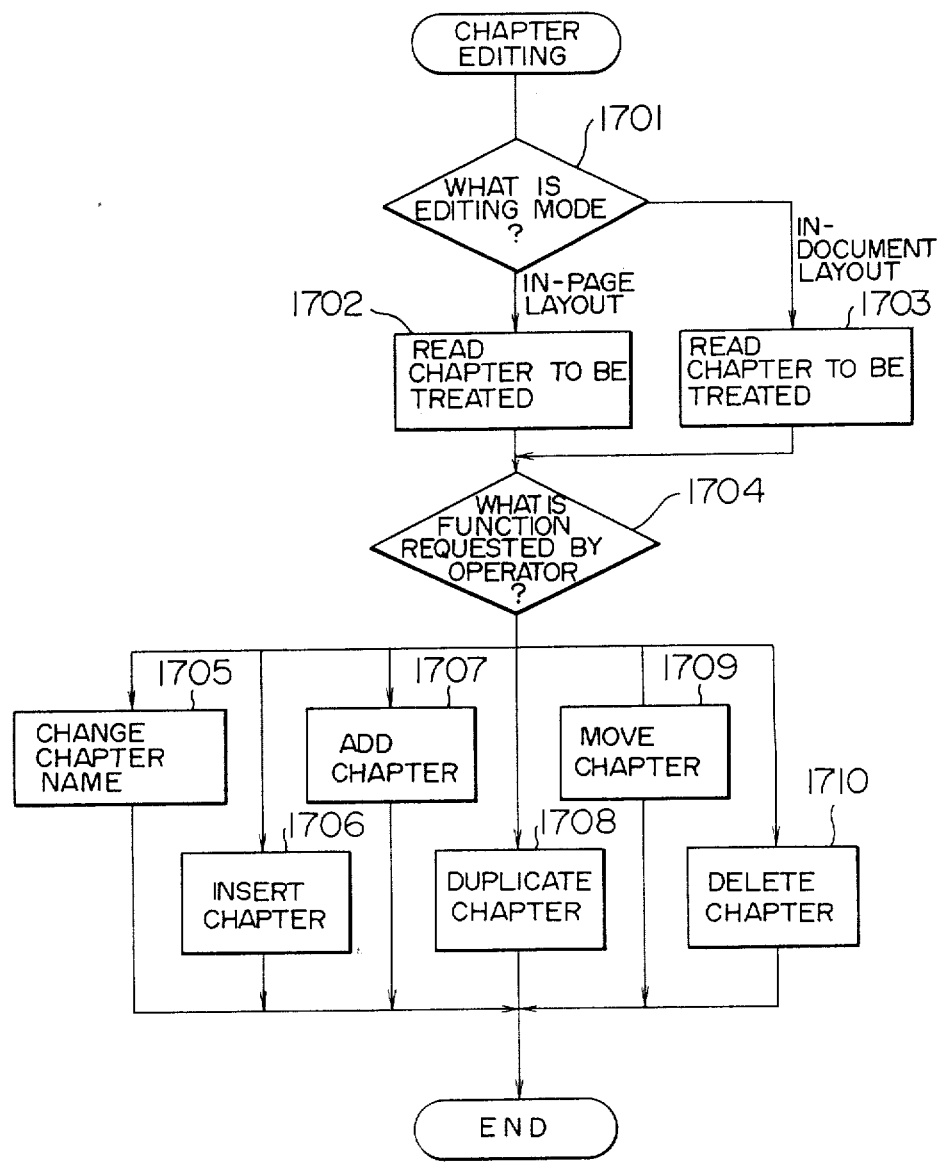
FIG. 6H is a view showing a processing made by a chapter editing unit.

Finally, a processing made in the chapter editing unit 56 will be explained along a flow chart shown in FIG. 6H.

Figure 7A:
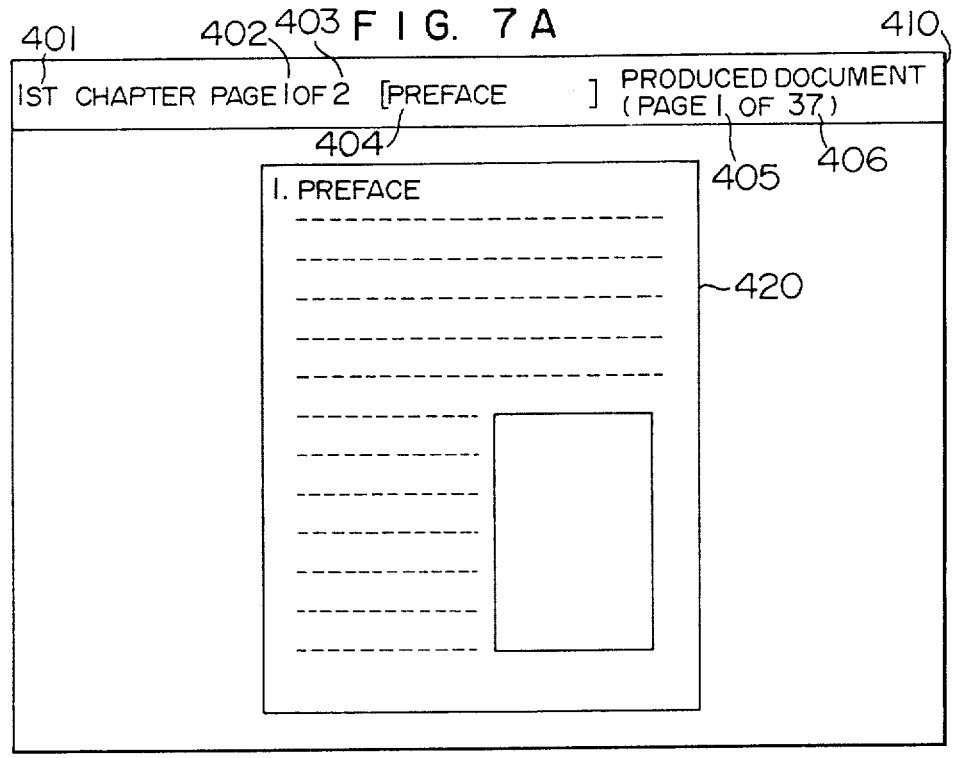
FIG. 7A is a view showing an example of a display screen image displayed in an in-page layout editing mode.
Figure 7B:
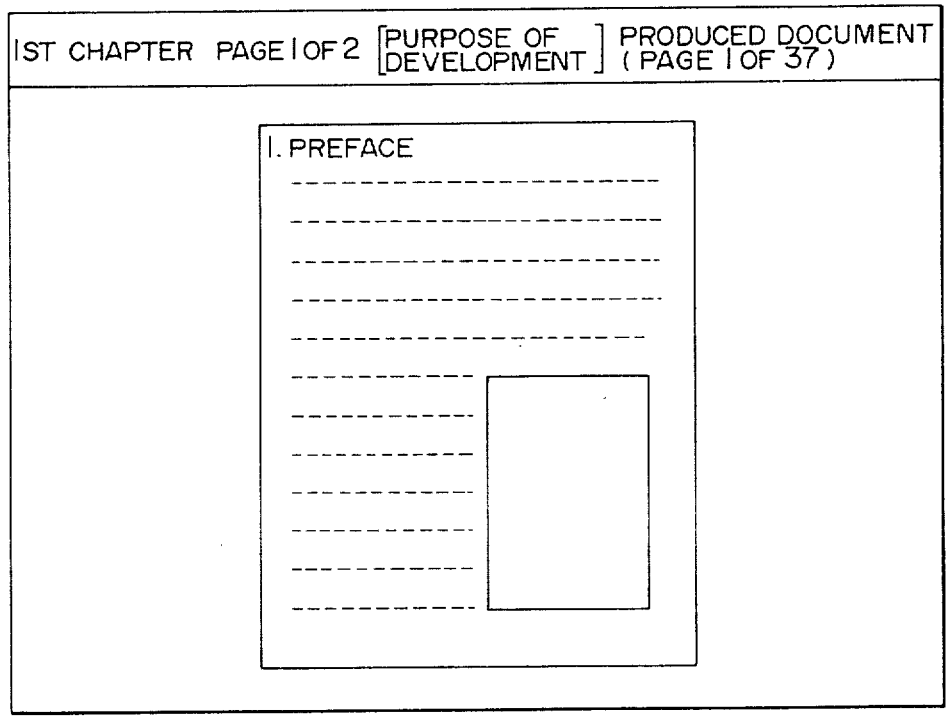
FIG. 7B is a view showing an example of a display screen image after the name of a chapter has been changed in the in-page layout editing mode.

First, like the case of the page editing, a judgement is made of whether the editing mode 301 is an in-page layout or an in-document layout (step 1701). In the case of the in-page layout editing mode, a chapter being displayed is read as an object to be treated from the display management table 300 (step 1702). In the case of the in-document layout editing mode, on the other hand, a chapter which is an object to be treated is read in accordance with information registered in the designated-object table 320 for in-document layout (step 1703). Next, what is a function requested by the operator is judged (step 1704) and the requested function is carried out (steps 1705 to 1710). Here, the chapter name change (step 1705) and the chapter movement (step 1709) will be explained by way of example. Now assume that the chapter name change is requested in a state in which the first chapter is being displayed in the in-page layout editing mode, as shown in FIG. 7A. Then, an auxiliary screen image for name change is displayed, as shown in FIG. 9. Now, if the operator inputs a new chapter name of "PURPOSE OF DEVELOPMENT" and instructs the execution of a change to the designated name, the chapter name 214 (see FIG. 2A) of the first chapter in the document data is changed in accordance with the chapter name read in the step 1702, thereby terminating the processing. As a result, a screen image is displayed again through step 1102 (see FIG. 6B) but with the changed chapter name 404 as shown in FIG. 7B. Also, now assume that in a state in which the first chapter is being designated in the in-document layout editing mode as shown in FIG. 8D, the operator requests the movement of that chapter to a document end mark 507 (or the end of the document). Then, the order or sequence of chapters in the chapter management table 210 is rearranged such that a chapter indicated by the start chapter number 323 stored in the designated-object table 320 for in-document layout becomes the last chapter in the document, and thereby the processing is terminated. As a result, an in-document layout is displayed again through step 1203 (see FIG. 6C) but with a screen image changed as shown by FIG. 8G.

As has been mentioned above, according to the present embodiment, all pages forming a document are displayed by patterns corresponding to the pages. Also, when the number of pages is increased, the pages are displayed partitively for every predetermined number of pages. Therefore, it is possible to easily confirm or recognize the construction of pages in the document. Further, in the case where the whole of the document is constructed by a plurality of chapters, an in-document layout is displayed partitively for every chapter while a consecutive chapter number, a start page number and an end page number are displayed for each chapter. Therefore, when the number of pages and the number of chapters are increased, it is possible to readily understand or recognize what pages and chapters as well as how many pages and chapters construct the document.

Furthermore, a layout of the whole of a page (in-page layout) and a layout of the whole of a document (in-document layout) are interchangeable. Therefore, if a page is designated on the in-document layout when a change-over from the in-document layout to the in-page layout is made, the contents of the pertinent page can be confirmed immediately on the in-page layout. On the other hand, when a change-over from the in-page layout to the in-document layout is made, there is indicated which page on the in-document layout does a page having been displayed on the in-page layout correspond to. Therefore, in the case where an operation or treatment in units of page or chapter is carried out on the in-document layout, a page or chapter to be treated can be designated with no error. Moreover, each of the editing in units of page and the editing in units of chapter can be carried out on each of the in-page layout and the in-document layout. Therefore, when the editing in units of page or chapter is carried out, it is possible to surely and readily perform the page or chapter editing on a layout which is desired by an operator.

As is apparent from the foregoing, in a document producing apparatus according to the present invention, since all pages forming a document are displayed by patterns corresponding to the pages and since the pages are displayed partitively for every predetermined number of pages in the case where the number of pages is increased, the construction of pages in the document can be confirmed easily, thereby improving a workability or operability in performing the editing in units of page.

Also, it is possible to interchange an in-page layout and an in-document layout from each other by referring to the page patterns and the overall construction of the document which are displayed in the above-mentioned manner. Therefore, if a page is designated on the in-document layout when a change-over from the in-document layout to the in-page layout is made, the contents of the pertinent page can be confirmed immediately on the in-page layout. On the other hand, when a change-over from the in-page layout to the in-document layout is made, there is indicated which page on the in-document layout does a page having been displayed on the in-page layout correspond to. Therefore, in the case where an operation or treatment in units of page or chapter is carried out on the in-document layout, a page or chapter to be treated can be designated with no error. Further, each of the editing in units of page and the editing in units of chapter can be carried out on each of the in-page layout and the in-document layout. Therefore, when the editing in units of page or chapter is carried out, it is possible to surely and readily perform the page or chapter editing on a layout which is desired by an operator.

We claim:

1. A document producing apparatus, comprising:
an input unit including means for inputting descriptive contents, such as characters or figures, which form a multi-page document and a format which defines a sheet size of a paper sheet to be used for each page of said document, a sheet direction of portrait or landscape in which the sheet is to be used, and a layout of the descriptive contents in each page;
a storage unit including means for storing therein said descriptive contents and said format inputted from said input unit;
a display unit for selectively displaying the contents stored by said storage unit; and
in-document layout displaying means for simultaneously displaying on said display unit respective page patterns of plural pages included in said document so that page information of the respective pages are partitioned in successive order from a leading page and for every one of a predetermined number of pages of said document and are arranged in one display image, said page information including at least the sheet size and the sheet direction stored in said storage unit.

2. A document producing apparatus, comprising:
an input unit including means for inputting descriptive contents, such as characters of figures, which form a document and a format which defines a sheet size of a paper sheet to be used, a sheet direction of portrait or landscape in which the sheet is to be used, and a layout of the descriptive contents in each page;
a storage unit including means for storing therein said descriptive contents and said format inputted from said input unit;
a display unit for selectively displaying the contents stored by said storage unit;
in-document layout displaying means for simultaneously displaying on said display unit respective page patterns of plural pages included in said document so that page information of the respective pages are partitioned in due order from a leading page and for every predetermined number of pages and are arranged in one display image, said page information including at least the sheet size and the sheet direction stored in said storage unit; and
chapter managing means for managing the plurality of pages forming said document while partitioning them into a plurality of chapters each of which includes a series of selected pages, said in-document layout displaying means displaying said page information partitively for every chapter.

3. A document producing apparatus according to claim 2, wherein the page information for every chapter displayed by said in-document layout displaying means includes a consecutive chapter number of that chapter, a page number of a leading page in that chapter, and a page number of an ending page in that chapter.

4. A document producing apparatus comprising:

an input unit including means for inputting descriptive contents, such as characters or figures, which form a document and a format which defines a sheet size of a paper sheet to be used, a sheet direction of portrait or landscape in which the sheet is to be used, and a layout of the descriptive contents in each page;

a storage unit including means for storing therein said descriptive contents and said format inputted from said input unit;

a display unit for selectively displaying the contents stored by said storage unit; and in-document layout editing means including means for simultaneously displaying on said display unit respective page patterns of plural pages included in said document so that page information of the respective pages ar partitioned in due order from a leading page and for every predetermined number of pages and are arranged in one display image, said page information including at least the sheet size and the sheet direction stored in said storage unit;

in-page layout editing means including means selective change-over between a document editing mode in which said in-document layout editing means operates and a page editing mode in which said in-page layout editing means operates;

means for specifying a page displayed in said page editing mode on a display image displayed on said display unit in said document editing mode in the case where a change-over from said page editing mode to said document editing mode is made by said editing control means;

means or designating a page to be displayed in said page editing mode on a display image displayed on said display unit in said document editing mode in he case where a changeover from said document editing mode to said page editing mode is made by said editing control means; and page editing means for selecting one or more pages the editing of which is desired and a type of the desired editing on the basis of information inputted from said input unit and executing the selected type of editing for the selected one or more pages.

5. A document producing apparatus according to claim 4, further comprising chapter managing means for managing the plurality of pages forming said document while partitioning them into a plurality of chapters each of which includes a series of selected pages, and chapter editing means for selecting a chapter the editing is desired and a type of the desired editing on he basis of information inputted from said input unit and executing the selected type of editing for the selected chapter, said in-document layout editing means displaying said page information partitively for every chapter.

* * * * *